United States Patent
Fujimoto

(10) Patent No.: US 8,948,307 B2
(45) Date of Patent: Feb. 3, 2015

(54) ASK SIGNAL GENERATOR

(71) Applicant: Kabushiki Kaisha Toshiba, Tokyo (JP)

(72) Inventor: Ryuichi Fujimoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 65 days.

(21) Appl. No.: 13/780,290

(22) Filed: Feb. 28, 2013

(65) Prior Publication Data

US 2013/0251067 A1 Sep. 26, 2013

(30) Foreign Application Priority Data

Mar. 23, 2012 (JP) ................................ 2012-068330

(51) Int. Cl.
*H03C 1/50* (2006.01)
*H04L 27/04* (2006.01)

(52) U.S. Cl.
CPC ..................................... *H04L 27/04* (2013.01)
USPC .......................................... 375/300; 375/309

(58) Field of Classification Search
USPC .......................... 375/295, 298, 300–301, 309;
340/870.18; 331/15, 46–47;
332/103–105, 115, 149–182
See application file for complete search history.

(56) References Cited

U.S. PATENT DOCUMENTS

| | | | |
|---|---|---|---|
| 6,792,050 B1 | 9/2004 | Shiikuma et al. | |
| 6,853,690 B1* | 2/2005 | Sorrells et al. | 375/295 |
| 2006/0077046 A1* | 4/2006 | Endo | 340/310.11 |
| 2014/0044157 A1* | 2/2014 | Chang et al. | 375/219 |

FOREIGN PATENT DOCUMENTS

| | | |
|---|---|---|
| JP | 11-313116 | 11/1999 |
| JP | 2000-49874 | 2/2000 |
| JP | 2004-208135 | 7/2004 |

* cited by examiner

*Primary Examiner* — Sam K Ahn
*Assistant Examiner* — Janice Tieu
(74) *Attorney, Agent, or Firm* — Oblon, Spivak, McClelland, Maier & Neustadt, L.L.P.

(57) ABSTRACT

According to one embodiment, an ASK signal generator includes a differential oscillator, a first modulator, a second modulator, a first transmission line, a second transmission line and an impedance adjustment circuit. The differential oscillator generates first and second signals having an opposite phase, and outputs the first and second signals from first and second output terminals. The first modulator connected to the first output terminal is set in the normally off state. The second modulator connected to the second output terminal is turned on or off according to a digital signal. The first and second transmission lines connected to the first and second output terminals have a length equal to a ¼ wavelength of the oscillation frequency of the differential oscillator. The impedance adjustment circuit is operated together with the second modulator according to the digital signal.

8 Claims, 3 Drawing Sheets

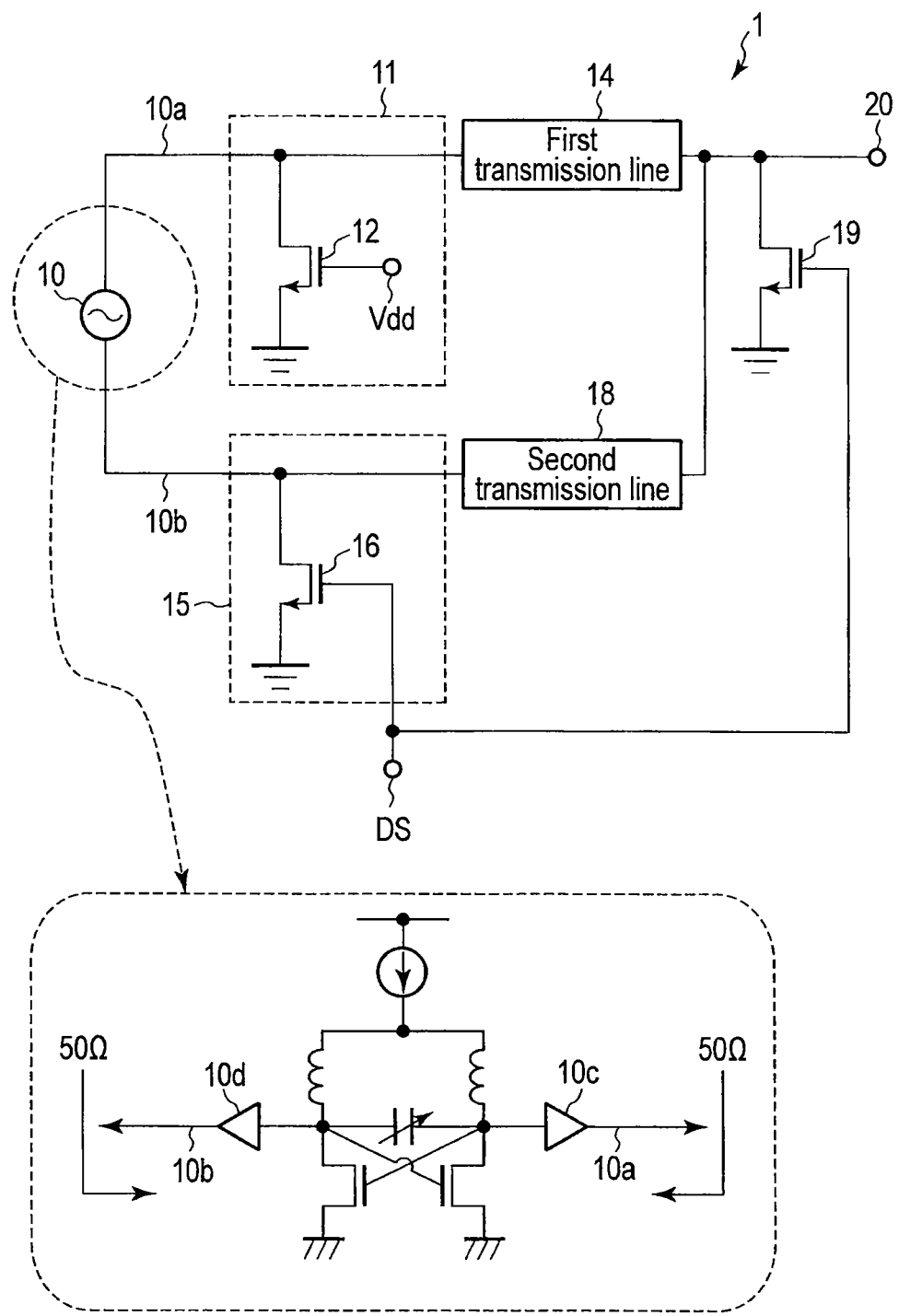
F I G. 1

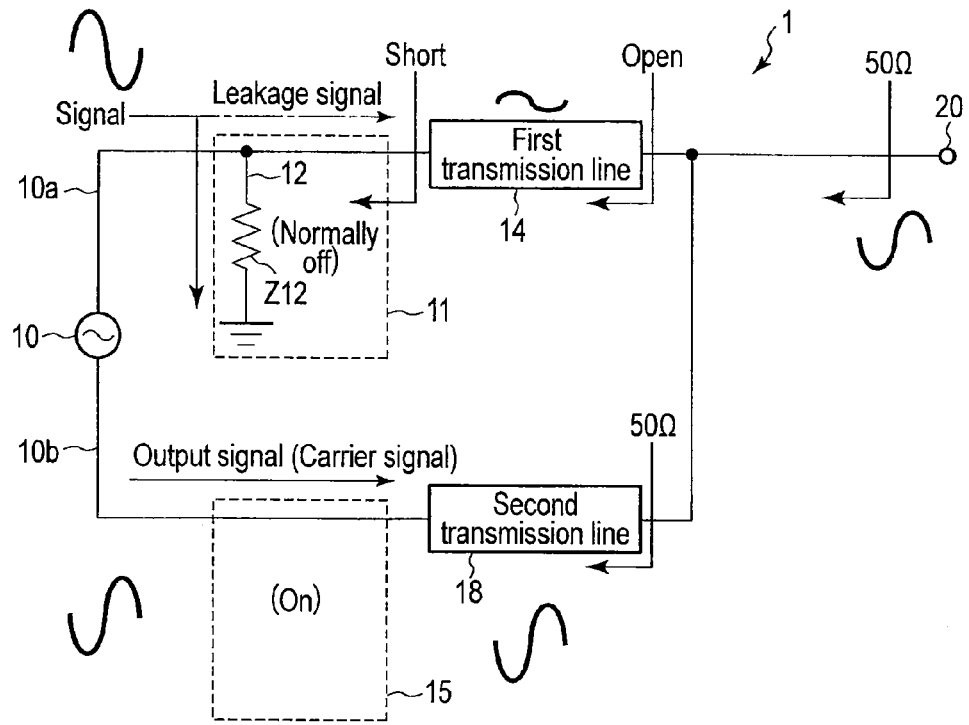
F I G. 2A
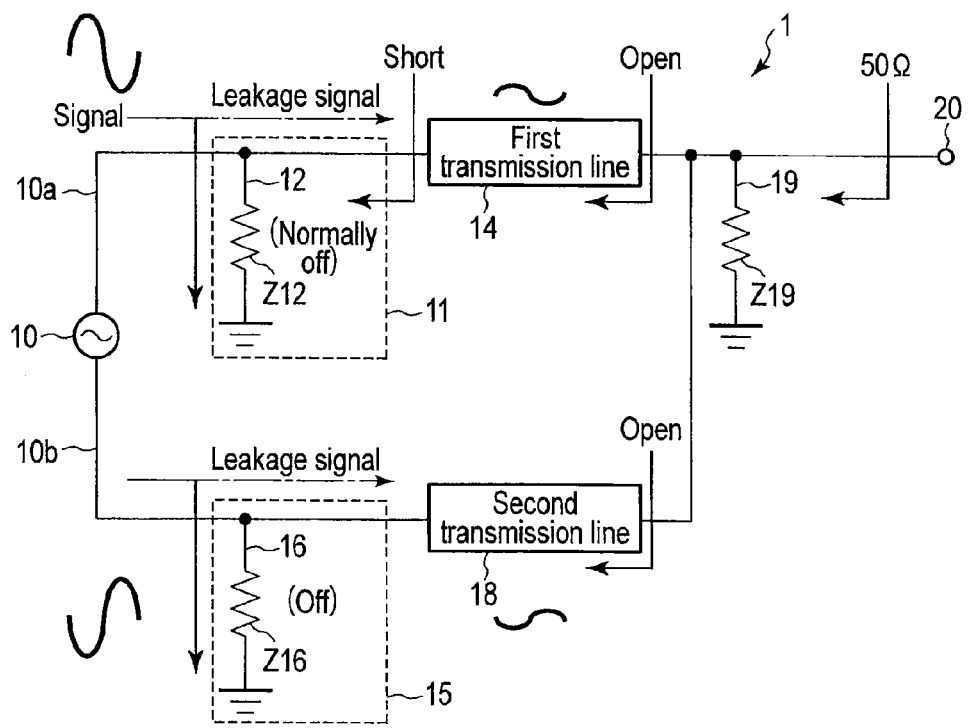
F I G. 2B

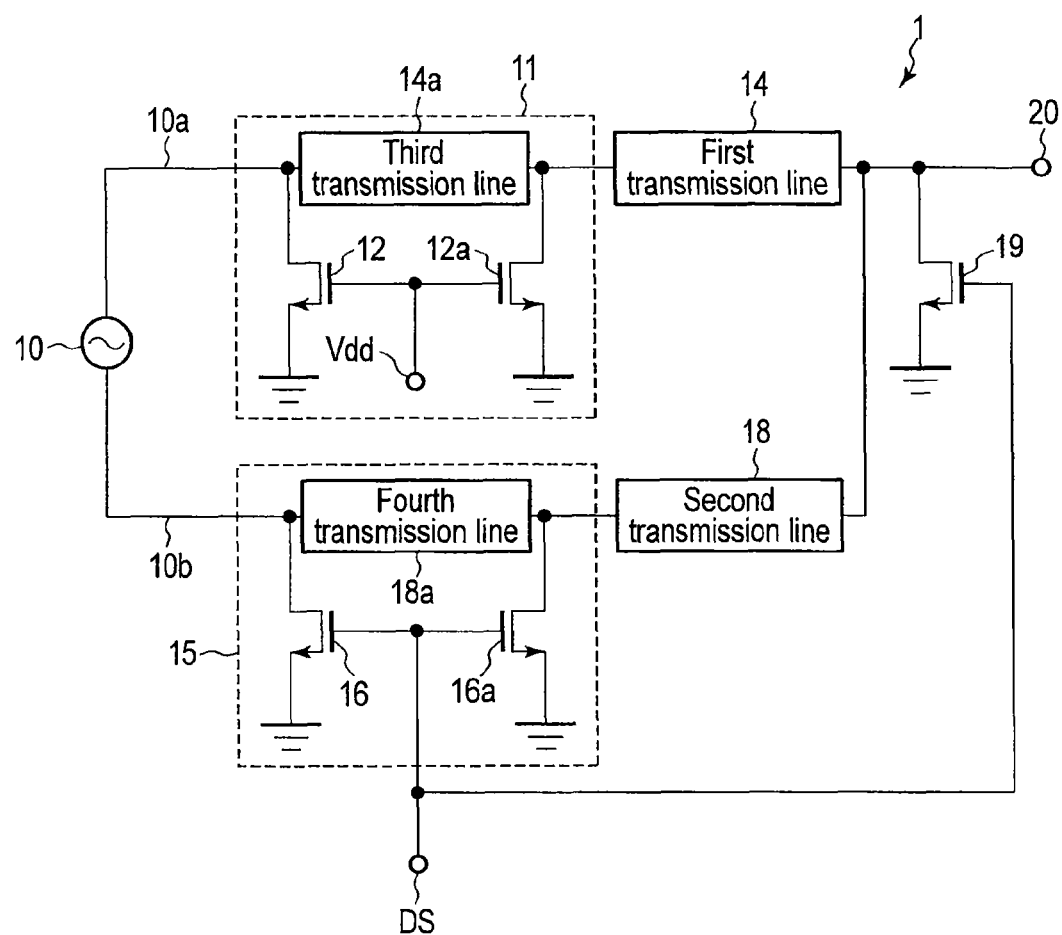
F I G. 3

US 8,948,307 B2

ASK SIGNAL GENERATOR

CROSS-REFERENCE TO RELATED APPLICATIONS

This application is based upon and claims the benefit of priority from Japanese Patent Application No. 2012-068330, filed Mar. 23, 2012, the entire contents of which are incorporated herein by reference.

FIELD

Embodiments described herein relate generally to an amplitude shift keying (ASK) signal generator applied to short-range communication, for example.

BACKGROUND

It is assumed that an ASK signal generator is set on when the amplitude of a sine wave is large and is set off when the amplitude of the sine wave is extremely small. In the off state, it is ideal to set a state in which the amplitude of the sine wave is zero, but in practice, the amplitude of the sine wave is output because of leakage. Therefore, as one of indices indicating the quality of an ASK signal, the on/off ratio indicating the ratio of ASK modulation output amplitudes in the on and off states is provided. For example, it is required to realize the on/off ratio of, for example, approximately 15 dB to correctly demodulate an ASK signal by means of a receiver.

In a general ASK signal generator, the on/off ratio is set in a tradeoff relationship with respect to the insertion loss of an ASK modulator. When the ASK signal generator is designed, the optimum design is made to permit two characteristics of the on/off ratio and the insertion loss to satisfy desired specifications.

Further, when signal power dealt with by the ASK signal generator becomes large, the ASK modulator performs a non-linear operation with a large input signal, output power at the on time decreases and, at the same time, leakage power at the off time increases to degrade the on/off ratio. A target on/off ratio can be achieved when input power to the ASK modulator is sufficiently small, but the on/off ratio is degraded as the input signal increases and it becomes impossible to satisfy the target specification. Therefore, it is desired to develop an ASK signal generator that can enhance the on/of ratio.

BRIEF DESCRIPTION OF THE DRAWINGS

FIG. 1 is a diagram showing the configuration of an ASK signal generator according to a first embodiment.

FIGS. 2A, 2B are diagrams for illustrating the operation of the ASK signal generator shown in FIG. 1.

FIG. 3 is a diagram showing the configuration of an ASK signal generator according to a second embodiment.

DETAILED DESCRIPTION

In general, according to one embodiment, an ASK signal generator includes a differential oscillator, a first modulator, a second modulator, a first transmission line, a second transmission line and an impedance adjustment circuit. The differential oscillator includes first and second output terminals, generates a first signal and a second signal having an opposite phase of the first signal, outputs the first signal from the first output terminal and outputs the second signal from the second output terminal. The first modulator is connected to the first output terminal of the differential oscillator and is set in the normally off state. The second modulator is connected to the second output terminal of the differential oscillator and is turned on or off according to a modulated signal. The first transmission line is connected to the first output terminal of the differential oscillator and has a length equal to a ¼ wavelength of the oscillation frequency of the differential oscillator. The second transmission line is connected to the second output terminal of the differential oscillator, has a length equal to a ¼ wavelength of the oscillation frequency of the differential oscillator and has an output terminal connected to the output terminal of the first transmission line. The impedance adjustment circuit is connected to the output terminals of the first and second transmission lines and is operated together with the second modulator according to the modulated signal.

The present embodiment is explained below with reference to the drawings. In the drawings, the same reference symbols are attached to the same portions.

First Embodiment

FIG. 1 shows the configuration of an ASK signal generator 1 according to a first embodiment.

In the ASK signal generator 1, an oscillator 10 is a differential oscillator, for example, and generates a first signal as a carrier wave and a second signal having an opposite phase of the first signal. For example, the oscillator 10 generates a sine wave signal of 60 to 120 GHz and the output impedance thereof is set to 50Ω, for example, via buffers 10c, 10d as shown by broken lines in FIG. 1.

A first ASK modulator 11 is connected in parallel with a first output terminal 10a from which a first signal of the oscillator 10 is output. That is, the first ASK modulator 11 includes a first transistor 12 configured by, for example, an n-channel MOS transistor that is connected in parallel between the first output terminal 10a of the oscillator 10 and the ground. Specifically, the drain of the first transistor 12 is connected to the first output terminal 10a, the source is grounded and the gate is supplied with a high-level signal. Therefore, the first transistor 12 is normally kept on.

The state in which the transistor is turned on and a modulated output signal is not generated means that the modulator is off. Further, the state in which the transistor is turned off and an output signal is generated means that the modulator is on.

The output terminal 10a of the oscillator 10 is connected to an output terminal 20 via a first transmission line 14. The first transmission line 14 is a so-called λ/4 transmission line having a wiring length equal to a ¼ wavelength of the oscillation wavelength λ of the oscillator 10.

Further, a second ASK modulator 15 is connected in parallel with a second output terminal 10b from which a second signal of the oscillator 10 is output. The second ASK modulator 15 includes a second transistor 16 configured by, for example, an n-channel MOS transistor that is connected in parallel between the second output terminal 10b of oscillator 10 and the ground. The drain of the second transistor 16 is connected to the second output terminal 10b, the source is grounded and the gate is supplied with digital signal DS as a binary sequence from a signal processing circuit (not shown). Therefore, the second transistor 16 is turned on or off based on digital signal DS.

The output terminal 10b of the oscillator 10 is connected to the output terminal 20 via a second transmission line 18. The second transmission line 18 is a λ/4 transmission line like the first transmission line 14.

A third transistor 19 configuring the impedance adjustment circuit is connected between the output terminal 20 and the ground. The third transistor 19 is configured by an n-channel MOS transistor, for example. The gate of the third transistor 19 is supplied with digital signal DS. Therefore, the third transistor 19 is turned on or off together with the second transistor 16. The on resistance of the third transistor is set to 50 Ohms, for example, then the output impedance of the ASK signal generator 1 is 50 ohms when the third transistor is in on state.

With the above configuration, the operation of the ASK signal generator is explained with reference to FIGS. 2A, 2B.

As described before, the first transistor 12 is set in the normally on state. In FIGS. 2A, 2B, symbols Z12, Z16, Z19 respectively indicate the impedances at the on time of the first to third transistors 12. FIG. 2A indicates a case wherein the ASK modulator 15 is on and FIG. 2B indicates a case wherein the ASK modulator 15 is off.

In the first ASK modulator 11 shown in FIG. 2A, most of the signal from the oscillator 10 flows into the ground via the first transistor 12 and a small leakage signal is output. Since the second transistor 16 and third transistor 19 are set off at this time, a signal from the oscillator 10 is output to the output terminal 20 via the second transmission line 18 and is added to a small leakage signal output from the first ASK modulator 11.

A small leakage signal outputs from the first ASK modulator 11 and a signal output from the second ASK modulator 15 have opposite phases. Therefore, the amplitude of the signal output from the second ASK modulator 15 becomes slightly small because of the small leakage signal output from the first ASK modulator 11, but a signal of a level that causes no problem is output to the output terminal 20.

At this time, regarding the output impedance, the output terminal of the first ASK modulator 11 is shorted, that is, the impedance becomes extremely small, but it is opened via the first transmission line 14. On the other hand, the output impedance of the second ASK modulator 15 is set to 50Ω as the output impedance of the oscillator 10. Therefore, the output impedance of the whole ASK signal generator 1 becomes 50Ω.

Next, the operation in a case where the second ASK modulator 15 is off is explained with reference to FIG. 2B.

In this case, both of the first ASK modulator 11 and the second ASK modulator 15 are turned off. Therefore, both of the output signals thereof become small leakage signals of opposite phases. The leakage signals of the opposite phases are added together. Therefore, two leakage signals are canceled and no signal is output from the output terminal 20.

At this time, the outputs of the first ASK modulator 11 and the second ASK modulator 15 are shorted, but the output impedance is converted into an open state via the first, second transmission lines 14, 18 of the ¼ wavelength. In this case, if the impedance 19a at the on time of the third transistor 19 is adjusted to become 50Ω, the output impedance of the whole ASK signal generator 1 becomes 50Ω.

According to the first embodiment described above, the first ASK modulator 11 including the first transistor 12 that is kept normally on is provided in parallel with the first output terminal 10a of the oscillator 10 that generates a differential signal and the second ASK modulator 15 including the second transistor 16 that is turned on or off according digital signal DS as a modulated signal is connected in parallel with the second output terminal 10b of the oscillator 10. Therefore, when both of the first and second Ask modulators 15 and 16 are off, the leakage signals can be canceled and the on/off ratio can be improved.

Further, when an attempt is made to set the insertion loss to 2 dB or less, the on/off ratio can be set to approximately 20 dB in the case of a general ASK modulator. However, in the case of this embodiment, since the leakage at the off time can be reduced to a variation level of the device, it can be expected to set the on/off ratio to 50 dB or more, for example.

Further, since the degree of leakage of a signal is determined only by the symmetry of an actual circuit or device even if a signal with large amplitude is input from the oscillator 10 and the first and second ASK modulators 11 and 15 perform the nonlinear operation, the leakage signal can be reduced. Therefore, even when a signal with large amplitude is input, a preferable on/off ratio can be maintained.

For example, it is required to set output power of the ASK signal generator to +10 dBm or more to maintain a practical communication distance in a radio device, for example. On the other hand, in this embodiment, since an ASK oscillator of a type that cancels leakage signals at the off time is used, no degradation in the on/off ratio due to the nonlinear operation occurs even when a signal with large amplitude is input. Therefore, sufficiently large output power can be secured.

Further, according to this embodiment, since the output impedance is kept constant when the ASK modulator is set on or off, occurrence of performance degradation due to impedance mismatch can be suppressed.

Thus, in this embodiment, a reduction in the insertion loss and degradation in the on/off ratio can be suppressed and the operation frequency band can be enhanced.

Second Embodiment

FIG. 3 shows the configuration of an ASK signal generator according to a second embodiment and the same symbols are attached to the same portions as those of the first embodiment.

In the first embodiment, it is desired that the first and second transistors 12 and 16 are ideally shorted in the on state, but they have slight impedance. Therefore, a leakage current flows. For this reason, in the second embodiment, an attempt is made to further reduce a leakage current in comparison with a case of the first embodiment.

In FIG. 3, a first ASK modulator 11 is configured by a pair of first and fourth transistors 12 and 12a and a third transmission line 14a. The third transmission line 14a is a transmission line of ¼ wavelength. The first transistor 12 is connected in parallel between a first output terminal 10a of an oscillator 10 and the ground. The input terminal of the third transmission line 14a is connected to the first output terminal 10a of the oscillator 10. The fourth transistor 12a is connected between the output terminal of the third transmission line 14a and the ground. The gates of the first and fourth transistors 12 and 12a are supplied with a high-level signal (Vdd). Therefore, the first and fourth transistors 12 and 12a of the pair are kept normally on.

A second ASK modulator 15 is configured by a pair of second and fifth transistors 16 and 16a and a fourth transmission line 18a. The fourth transmission line 18a is a transmission line of ¼ wavelength. The second transistor 16 is connected between a second output terminal 10b of the oscillator 10 and the ground. The input terminal of the fourth transmission line 18a is connected to the second output terminal 10b of the oscillator 10. The fifth transistor 16a is connected between the output terminal of the fourth transmission line 18a and the ground. The gates of the second and fifth transistors 16 and 16a are supplied with digital signal DS output as a binary sequence from a signal processing circuit (not shown). Therefore, the second and fifth transistors 16 and 16a are turned on or off based on a digital signal process.

In the second embodiment, the basic operation is the same as that of the first embodiment.

In the second embodiment, a leakage signal generated in the first transistor 12 is further reduced by means of the fourth transistor 12a. Therefore, a leakage signal outputs from the first ASK modulator 11 becomes extremely small. Further, as in the first ASK modulator 11, a leakage signal generated in the second transistor 16 is further reduced by means of the fifth transistor 16a in the second ASK modulator 15. Therefore, a leakage signal output from the second ASK modulator 15 becomes extremely small. Further, since a leakage signal outputs from the first ASK modulator 11 and a leakage signal output from the second ASK modulator 15 have opposite phases, the leakage signals are almost perfectly canceled in the output terminal 20.

According to the second embodiment, the third transmission line 14a and fourth transistor 12a are further provided in the first ASK modulator 11 and the fourth transmission line 18a and fifth transistor 16a are further provided in the second ASK modulator 15. Therefore, the leakage signal outputs from the first ASK modulator 11 and the leakage signal of the opposite phase output from the second ASK modulator 15 can be greatly reduced in comparison with the first embodiment. As a result, it becomes possible to almost perfectly cancel a leakage signal output from the ASK signal generator 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ASK (Amplitude Shift Keying) signal generator comprising:
    a differential oscillator configured to include first and second output terminals and generate a first signal and a second signal with an opposite phase of the first signal, the differential oscillator outputting the first signal from the first output terminal and outputting the second signal from the second output terminal;
    a first modulator connected to the first output terminal of the differential oscillator, configured to be set in a normally off state;
    a second modulator connected to the second output terminal of the differential oscillator, configured to turn on/off according to a modulated signal;
    a first transmission line connected to the first output terminal of the differential oscillator and having a first length equal to a ¼ wavelength of the oscillation frequency of the differential oscillator;
    a second transmission line connected to the second output terminal of the differential oscillator, having a second length equal to a ¼ wavelength of the oscillation frequency of the differential oscillator and having an output terminal connected to an output terminal of the first transmission line; and
    an impedance adjustment circuit connected to the output terminals of the first and second transmission lines, configured to operate together with the second modulator according to the modulated signal.

2. The generator according to claim 1, wherein the first modulator includes a first transistor that is kept in a normally on state and is connected between the first output terminal of the differential oscillator and a ground.

3. The generator according to claim 1, wherein the second modulator includes a second transistor that is connected between the second output terminal of the differential oscillator and a ground and is turned on/off according to the modulated signal.

4. The generator according to claim 1, wherein the impedance adjustment circuit includes a third transistor that is connected between the output terminals of the first and second transmission lines and a ground and is turned on/off according to the modulated signal and the impedance adjustment circuit at an on time of the third transistor is set equal to the output impedance of the differential oscillator.

5. The generator according to claim 1, wherein the first modulator comprises:
    a third transmission line connected between a connection node of the first output terminal of the differential oscillator and a first transistor and an input terminal of the first transmission line and having the first length equal to the ¼ wavelength of the oscillation frequency of the differential oscillator; and
    a fourth transistor that is kept in the normally on state and is connected between a connection node of the third transmission line and the first transmission line and the ground.

6. The generator according to claim 1, wherein the second modulator comprises:
    a fourth transmission line connected between a connection node of the second output terminal of the differential oscillator and a second transistor and an input terminal of the second transmission line and having the second length equal to the ¼ wavelength of the oscillation frequency of the differential oscillator; and
    a fifth transistor that is connected between a connection node of the fourth transmission line and the second transmission line and the ground and is turned on/off according to the modulated signal.

7. An ASK (Amplitude Shift Keying) signal generator comprising:
    a differential oscillator configured to include first and second output terminals and generate a first signal and a second signal with an opposite phase of the first signal, the differential oscillator outputting the first signal from the first output terminal and outputting the second signal from the second output terminal;
    a first modulator connected to the first output terminal of the differential oscillator, configured to be set in a normally off state;
    a second modulator connected to the second output terminal of the differential oscillator, configured to turn on/off according to a modulated signal;
    a first transmission line connected to the first output terminal of the differential oscillator and having a first length equal to a ¼ wavelength of an oscillation frequency of the differential oscillator;
    a second transmission line connected to the second output terminal of the differential oscillator, having a second length equal to a ¼ wavelength of the oscillation frequency of the differential oscillator and having an output terminal connected to an output terminal of the first transmission line; and
    an impedance adjustment circuit connected to the output terminals of the first and second transmission lines and operated together with the second modulator according to the modulated signal;
    wherein the first modulator comprises:

a first transistor that is connected between the first output terminal of the differential oscillator and a ground, and is set in the normally on state;

a third transmission line connected between a first connection node of the first output terminal of the differential oscillator and the first transistor and an input terminal of the first transmission line and having the first length equal to the ¼ wavelength of the oscillation frequency of the differential oscillator; and a fourth transistor that is connected between a second connection node of the third transmission line and the first transmission line and the ground, and is set in the normally on state; and the second modulator comprises:

a second transistor that is connected between the second output terminal of the differential oscillator and the ground, and is turned on/off according to the modulated signal;

a fourth transmission line connected between a third connection node of the second output terminal of the differential oscillator and the second transistor and an input terminal of the second transmission line and having the second length equal to the ¼ wavelength of the oscillation frequency of the differential oscillator; and a fifth transistor that is connected between a fourth connection node of the fourth transmission line and the second transmission line and the ground, and is turned on/off according to the modulated signal.

8. The generator according to claim 7, wherein the impedance adjustment circuit includes a third transistor that is connected between the output terminals of the first and second transmission lines and the ground and is turned on/off according to the modulated signal and the impedance adjustment circuit at an on time of the third transistor is set equal to the output impedance of the differential oscillator.

* * * * *